United States Patent
Raj

Patent Number: 6,046,859
Date of Patent: Apr. 4, 2000

[54] SEGMENTED LENS

[75] Inventor: Kannan Raj, Chandler, Ariz.

[73] Assignee: Intel Corporation, Santa Clara, Calif.

[21] Appl. No.: 09/179,017

[22] Filed: Oct. 26, 1998

[51] Int. Cl.[7] .................................................. G02B 3/00
[52] U.S. Cl. ...................... 359/649; 359/742; 359/625; 359/619
[58] Field of Search ........................... 359/619, 628, 359/742, 625

[56] References Cited

U.S. PATENT DOCUMENTS

| | | | |
|---|---|---|---|
| 4,130,346 | 12/1978 | Polley | 350/114 |
| 4,517,630 | 5/1985 | Dieffenbach et al. | 362/268 |
| 4,945,348 | 7/1990 | Ibanoto et al. | 340/784 |
| 5,390,084 | 2/1995 | Ohtake et al. | |
| 5,442,178 | 8/1995 | Baldwin | 250/353 |
| 5,551,042 | 8/1996 | Lea et al. | 359/742 |
| 5,676,804 | 10/1997 | Fujii et al. | |
| 5,870,255 | 2/1999 | Ogino et al. | 359/457 |
| 5,872,654 | 2/1999 | Shirochi | 359/566 |
| 5,886,821 | 3/1999 | Sohn | 359/619 |
| 5,900,637 | 5/1999 | Smith | 250/492.22 |

*Primary Examiner*—Scott J. Sugarman
*Assistant Examiner*—Tim Thompson
*Attorney, Agent, or Firm*—Trop, Pruner & Hu, P.C.

[57] ABSTRACT

A segmented aperture lens having multiple lens segments having predetermined patterns. Each lens segment may be a fresnel lens. The lens segments may be arranged in a two-dimensional array or a one-dimensional array.

21 Claims, 4 Drawing Sheets

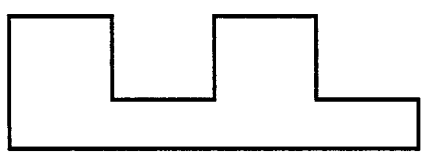
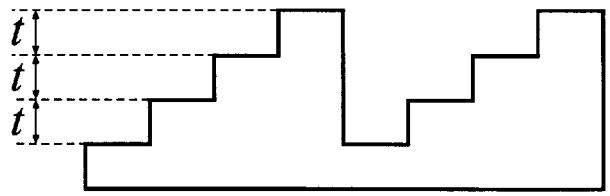
FIG. 3A  FIG. 3B
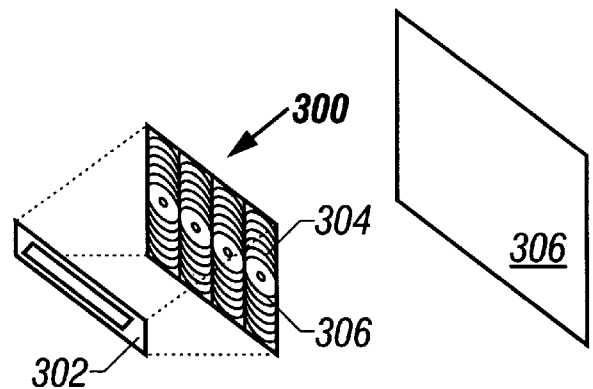
FIG. 4
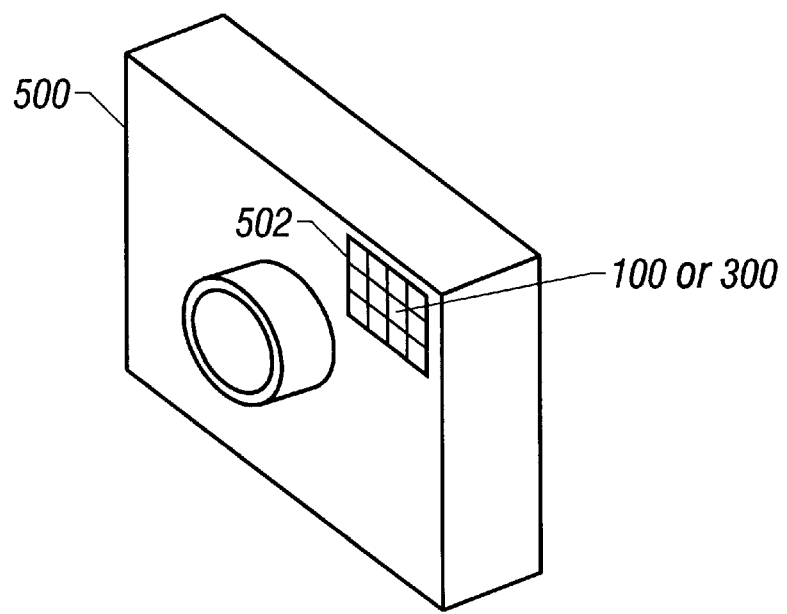
FIG. 6

SEGMENTED LENS

BACKGROUND

This invention relates to lenses having multiple segments.

Different types of lenses are used in light sources, such as those in projector systems and in cameras. Referring to FIGS. 7A and 7B, one type of lens includes a fresnel lens 10, which is a thin, light-weight relatively planar lens that is formed by minute prisms 12 aligned in generally concentric grooves on a flat plate or sheet 11. A light source 30 is positioned behind the fresnel lens to shine light through the fresnel lens 10 to a target object 20 (which may be an object to be photographed by a camera or a screen used with a projector system, for example). The light source 30 may include a flash tube 32 and a reflector 34 to shine light onto the grooved side of the lens 10. The flat side 15 faces the target object 20.

With a typical fresnel lens, light non-uniformity may occur over the field of view. One such distortion involves a light distribution that is referred to as having a "dog bone" shape from the center to the edge of the field of view. Such distortion may adversely affect quality of images taken by a camera with strobe illumination or images projected on a screen by a projection system, as examples. The distortion may be attributed to the tube shadow of the flash tube 32 that forms part of the light source 30.

Thus, a need exist for a lens that can improve illumination uniformity characteristics of a light source.

SUMMARY

In general, according to one embodiment, the invention features a lens having multiple segments arranged in an array, the lens segments having predetermined patterns.

Other features will become apparent from the following description and from the claims.

BRIEF DESCRIPTION OF THE DRAWINGS

FIGS. 3A and 3B illustrate portions of multi-level lens facets.

FIG. 4 is a diagram of a light system including a segmented lens having a one-dimensional array of fresnel lens facets according to another embodiment of the invention.

FIG. 6 is a diagram of a camera that incorporates an embodiment of the invention.

DETAILED DESCRIPTION

Embodiments of the invention include a segmented lens having segmented aperture or multiple lens facets or segments. In one embodiment, each facet includes a reduced sized fresnel lens. When arranged in an array (either one- or two-dimensional), the facets or segments make up a lens that is about the size of a typical lens used in lighting devices, such as those found in a camera or projection system. When light from a light source is shined through the segmented fresnel lens, the total light intensity at any point in an object plane is a superposition of the intensity contribution from each individual lens facet.

Figure 1:
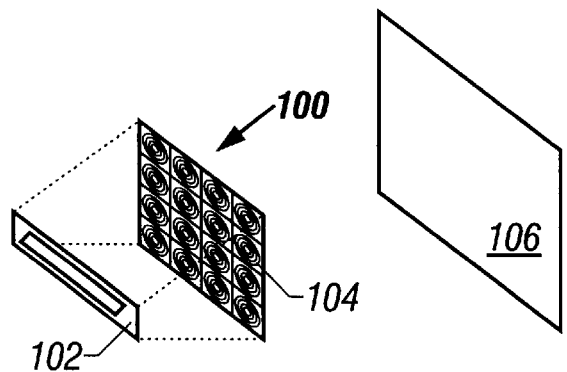
FIG. 1 is a diagram of a light system including a segmented lens having a two-dimensional array of fresnel lens facets according to an embodiment of the invention.

As shown in FIG. 1, a light source 102 (which may include a flash tube such as that used in the flash of a camera) illuminates the individual lens facets 104 of the segmented lens 100. In the embodiment of FIG. 1, the segmented lens 100 is arranged as a two-dimensional array of fresnel lens facets 104. Using the two-dimensional segmented lens 100, light from the linear light source 102 is partitioned more effectively as a two-dimensional array of point sources to provide better lens focusing performance over the field of view and to enhance uniformity of light intensity distributed over a target object 106. Illumination of any given point on the target object 106 is contributed by light passed through each of the lens facets 104. By distributing the light source over multiple lens facets or segments that are arranged in any array, more effective distribution of light may be achieved.

Each fresnel lens facet may be designed to have one of many different structures. For example, each fresnel lens facet may be configured to have a generally spherical lens structure, an elliptical lens structure, or other lens structure, which is associated with different focal lengths and phase functions. By using multiple lens facets to form a single segmented aperture lens, greater flexibility is afforded in the design of the lens. For example, by varying the patterns of the lens facets (performed by varying the fresnel lens structures of each facet), different focal lengths and phase distributions may be designed into the different lens facets. This allows the lens manufacturer to compensate for any non-uniformities due to distortions or aberrations.

Figure 2A:
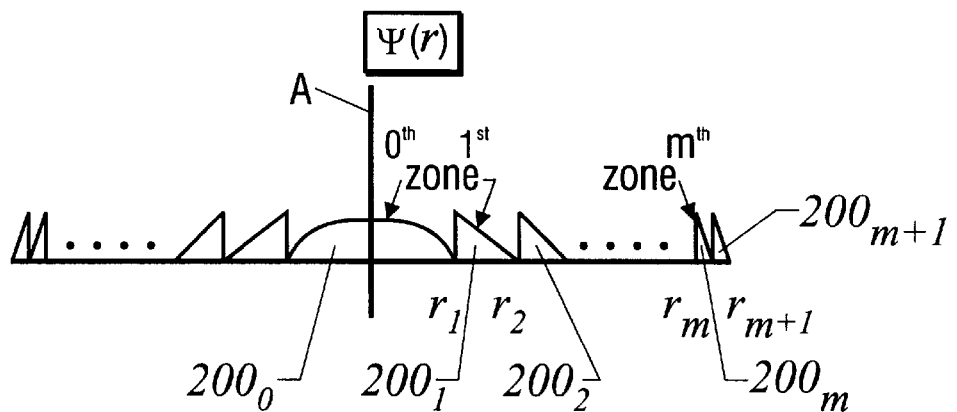
FIG. 2A is a graph illustrating the continuous phase function of a fresnel lens facet.

The following provides a brief description of how each fresnel lens facet may be structured. Each fresnel lens facet 104 of the segmented aperture lens 100 may be implemented as a continuous phase structure or, alternatively, as a binary or other multi-level phase structure. Referring further to FIG. 2A, the phase function $\psi_F$ of a fresnel lens facet 104 having a continuous phase structure is illustrated as a function of the radius r of the lens facet. The phase function $\psi_F$ has a sawtooth profile that is separated into multiple zones starting with a $0^{th}$ zone $200_0$ and radiating outward to zones $200_1, 200_2, \ldots, 200_m$, and $200_{m+1}$. The configuration of FIG. 2A illustrates a lens facet 104 having a "blazed-type" pattern. As illustrated, the width of each zone $200_i$ decreases progressively as the zones go outward from the center axis A. The width of the smallest zone $200_{m+1}$ is proportional to the wavelength $\lambda$ of the incident light and inversely proportional to the numerical aperture, which is in turn inversely proportional to the F/# of the lens facet 104 (focal length F divided by diameter of a lens facet).

Each lens facet 104 may be a converging lens. Generally, for a converging lens having a focal length F that is much larger than its lens aperture, a phase function $\psi(r)$ is expressed as in Eq. 1:

$$\psi(r) = \exp\left[\frac{-j\pi}{\lambda F}r^2\right] \quad \text{(Eq. 1)}$$

where $\lambda$ is the wavelength of incident light, F is the focal length and r denotes the radial distance from the center axis A. If the phase function $\psi(r)$ as expressed in Eq. 1 is modified to have a modulo $2\pi$ structure to represent a fresnel lens facet having a "blazed type" pattern, such as the fresnel lens facet 104 as shown in FIG. 2A, then the phase function $\psi_F$ of the fresnel lens facet 104 is expressed by Eq. 2.

$$\psi_F = \psi(r) + 2m\pi, r_m < r < r_{m+1}, \quad \text{(Eq. 2)}$$

where $r_m$ is the inner radius (from the axis A) of zone 200$_m$ and $r_{m+1}$ is the inner radius of zone 200$_{m+1}$. The value of $r_m$ is determined by Eq. 3.

$$r_m = \sqrt{2m\lambda F + (m\lambda)^2}. \quad \text{(Eq. 3)}$$

If $r_m$ is set equal to a given radius R of a lens facet 104, the value of m may be derived by solving Eq. 3, from which the number of zones can be calculated.

Figure 2B:
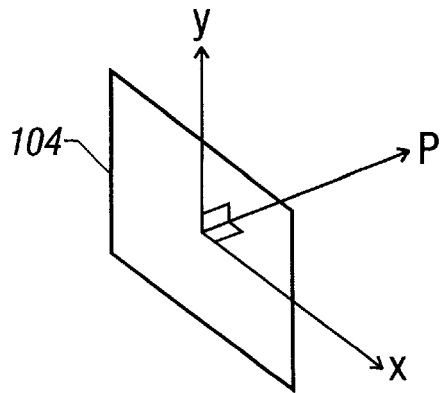
FIG. 2B illustrates the different axes associated with a lens facet.

In the illustrated fresnel lens facet of FIG. 2A, the continuous phase function $\psi_F$ of the lens is radially symmetric, which results in the focal lengths $F_1$ and $F_2$ of the lens facet being the same value along axes x and y, respectively, which are both orthogonal to the optical axis P of the lens facet, as shown in FIG. 2B. In an alternative embodiment, the lens facet 104 may be made to have different curvatures along the orthogonal axes x and y, which results in the focal lengths $F_1$ and $F_2$ being different for the two orthogonal axes x and y. An example is a lens facet with an elliptical curvature. If the radial axis r is expressed in terms of the x and y axes, the phase function $\psi(x, y)$ that is identical to $\psi(r)$ of Eq. 1 may be expressed as Eq. 4 for a symmetric lens facet in which $F_1$ and $F_2$ are equal to the value F.

$$\psi(x, y) = \exp\left[\frac{-j\pi}{\lambda F}(x^2 + y^2)\right]. \quad \text{(Eq. 4)}$$

If the focal lengths $F_1$ and $F_2$ are not the same, then the phase function $\psi(x, y)$ is expressed by Eq. 5.

$$\psi(x, y) = \exp\left[\frac{-j\pi}{\lambda}\left(\frac{x^2}{F_1} + \frac{y^2}{F_2}\right)\right]. \quad \text{(Eq. 5)}$$

In an alternative embodiment, the continuous phase function $\psi(r)$, as expressed in Eq. 1, may be quantized into two or more phase levels. For example, the phase function $\psi(r)$ for a two-level or binary fresnel lens facet may be expressed by Eq. 6.

$$\psi(r) = 1 \quad \text{if } \cos\left(\frac{\pi}{\lambda F}r^2\right) > 0, \quad \text{(Eq. 6)}$$
$$= -1 \quad \text{otherwise}$$

A cross-section of a portion of a binary lens element is illustrated in FIG. 3A.

A cross-section of a portion of a four-level lens element is illustrated in FIG. 3B. For an M-phase diffractive element, the thickness t per phase is given by Eq. 7.

$$t = \frac{\lambda}{M*(n-1)}, \quad \text{(Eq. 7)}$$

where n is the refractive index of the lens material and $\lambda$ is the wavelength of illumination. The thickness t is the thickness of each level of the multi-level fresnel lens element, as illustrated in FIG. 3B.

Fresnel lens facets implemented as multi-level phase structures are generally easier to manufacture than a lens facet having a continuous phase structure. However, the diffraction characteristics of the binary and multi-level structures are inferior to those of the continuous phase lens facet illustrated in FIG. 2A. The first order diffraction efficiency $\eta$ of a multi-level structure is given by Eq. 8.

$$\eta = \left[\frac{\sin\left(\frac{\pi}{M}\right)}{\frac{\pi}{M}}\right]^2, \quad \text{(Eq. 8)}$$

where M is the number of phase levels. The table below summarizes the first order diffraction efficiency as a function of the number of phase levels. As illustrated, the diffraction efficiency of each multi-level structure fresnel lens is some fraction of the diffraction efficiency of a continuous phase structure fresnel lens.

TABLE 1

| Phase Levels M | First Order Diffraction Efficiency |
|---|---|
| 2 | 0.41 |
| 3 | 0.68 |
| 4 | 0.81 |
| 5 | 0.87 |
| 6 | 0.91 |
| 8 | 0.95 |
| 12 | 0.98 |
| 16 | 0.99 |

The diffraction efficiency is low for a binary (two-level) lens facet while the efficiency of a sixteen-level lens facet is 0.99. Thus, the number of phase levels M selected for a multi-level lens facet depends on the desired tradeoff between ease of manufacture and diffraction efficiency.

Figure 5A:
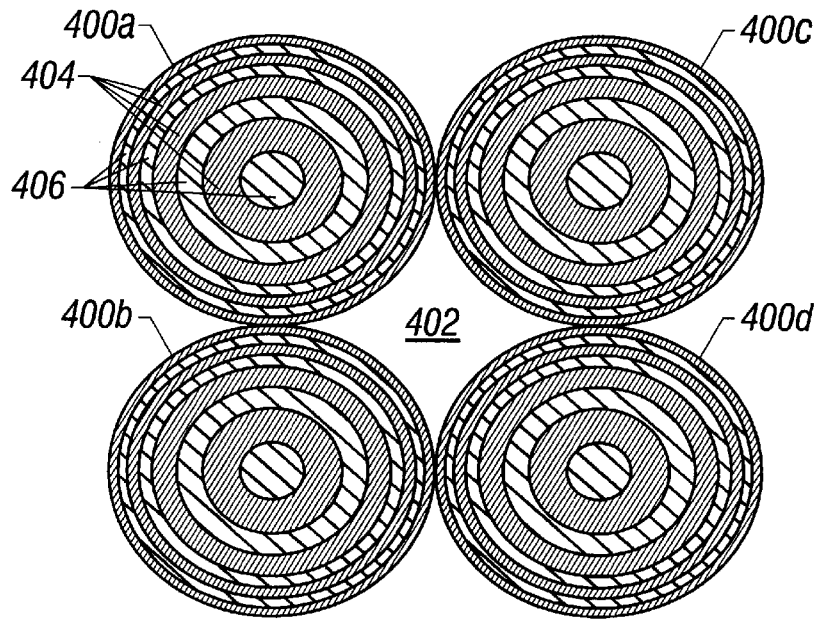
FIGS. 5A and 5B are diagrams of binary fresnel lens facets arranged in a two-dimensional array arranged according to embodiments of the invention.

Referring to FIG. 5A, a portion of a segmented lens having a two-dimensional array of binary lens facets 400A, B, C and D is illustrated. Each binary lens 400 includes concentric rings of lens structures in which the darkened rings (indicated as 404) have a phase function $\psi(r)$ of −1 and the lighter rings (indicated as 406) have a phase function $\psi(r)$ of +1, as provided by Eq. 6.

Figure 5B:
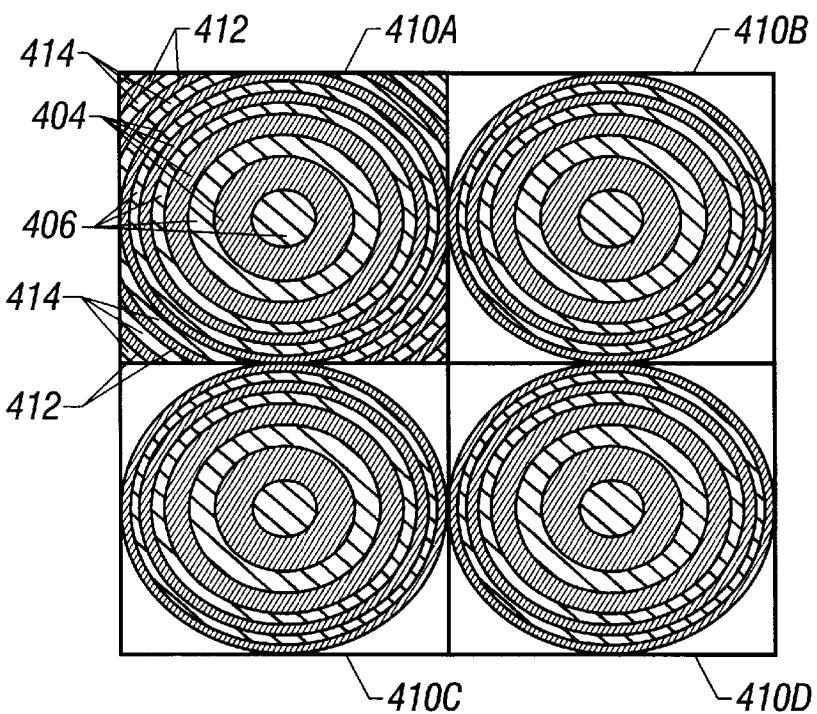
Figure 7A:
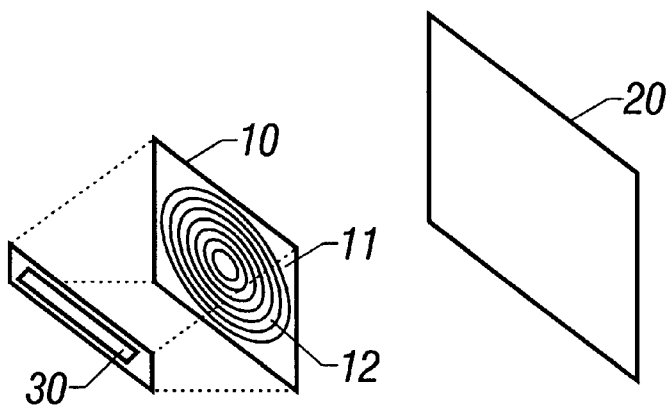
FIGS. 7A–7B are diagrams of a light system including a prior art fresnel lens.
Figure 7B:
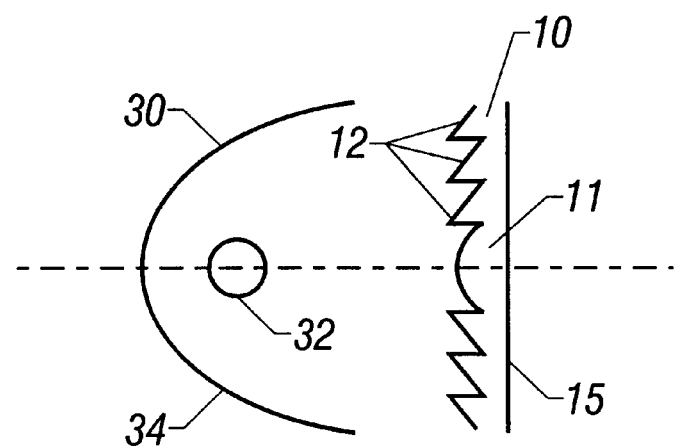

In addition to the phase functions of the binary lens facets 400A–D, the inter-lens space (such as space 402) between the lens facets also are associated with phase structures. The phase functions of these inter-lens space phase structures may be bounded within a square, rectangle, hexagon or other boundary. For example, as shown in FIG. 5B, the boundaries may be rectangular, indicated as 410A–410D. Within each boundary 410, additional portions of rings 412 and 414 (that are concentric with rings 404 and 406 but which are cut off at the specified boundaries) may be added within the boundaries 410. These added ring portions 412 and 414 will have phase functions similar to the phase function of rings 404 and 406.

Referring to FIG. 4, an alternative embodiment of a segmented aperture lens 300 is illustrated. In the embodiment of FIG. 4, the segmented lens 300 includes a one-dimensional array of lens facets 304 arranged as vertical strips across the lens. In the embodiment of FIG. 4, the concentric rings 306 of each lens facet 304 are cut off by the vertical boundaries of each facet because the vertical length of each lens facet 304 is larger than its width. Although shown vertically side by side, the lens facets may alternatively be arranged horizontally in a top-down fashion. Light from a light source 302 is illuminated through the lens facets 304 onto a target object 306. In the embodiment of FIG. 4, the line source 302 is partitioned into segments corresponding to the lens facets 304. Again, distributing the source over multiple facets enhances light distribution uniformity over the target object 306.

Thus, advantages offered by embodiments of the present invention may include uniform illumination over the entire field of view of the target object. Uniformity of camera strobe illumination may improve still picture image quality, for example, particularly for indoor pictures taken with the strobe on. Greater flexibility is also provided; for example, the focal length of each lens facet may be made variable or uniform as desired. Thus, a lens facet at the edge of an array in the segmented aperture lens may have a different focal length than the lens facet near the center. In addition, each lens facet may be designed with elliptical curvature (such that different focal lengths are created along axes orthogonal to the optical axis). Phase functions of the lens facets may be optimized to minimize non-uniformities due to distortion and aberration. Overlapping lens facets may alternatively be used to improve strobe uniformity. Further, improved light distribution characteristics may be accomplished without significantly increasing manufacturing cost, as the segmented aperture lens may be easily manufactured at relatively low cost. For example, the segmented lens may be molded in plastic using existing manufacturing techniques, except for a one time cost to build the lens master copy containing the multiple facets.

Referring to FIG. 6, the segmented aperture lens 100 or 300 (of FIG. 1 or 4) may be used in a device 500 (such as an analog or digital camera) having a light projection system 502. In a camera, the light projection system 502 may include a strobe light for eliminating the red-eye effect or a flash bulb to brightly illuminate the target in a darkened area.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A light projection system for distributing light onto at least a portion of a target, comprising:

a user-activable light source;

a lens positioned to receive light from the light source; and the lens having a plurality of lens segments arranged in an array, the lens segments having at least one predetermined pattern and each lens segment arranged to contribute light to any given point on the target portion to enhance uniformity of light distributed over the target portion.

2. The light projection system of claim 1, wherein each lens segment includes a fresnel lens.

3. The light projection system of claim 1, wherein each lens segment has substantially the same predetermined pattern.

4. The light projection system of claim 1, wherein the lens segments are arranged in a two-dimensional array.

5. The light projection system of claim 1, wherein the lens segments are arranged in a one-dimensional array.

6. The light projection system of claim 1, wherein each lens segment includes a continuous phase structure.

7. The light projection system of claim 6, wherein each lens segment is associated with a phase function having multiple zones arranged in a generally sawtooth profile.

8. The light projection system of claim 1, wherein each lens segment has an optical axis, each lens segment including structures that are adapted to provide substantially the same focal length along two axes orthogonal to the optical axis.

9. The light projection system of claim 1, wherein each lens segment includes a multi-level phase structure.

10. A light projection system comprising:

a light source;

a lens positioned to receive light from the light source; and the lens having a plurality of lens segments arranged in an array, the lens segments having predetermined patterns, wherein each lens segment includes structures having different curvatures along axes orthogonal to the optical axis of the lens segment.

11. The light projection system of claim 10, wherein the focal lengths along the orthogonal axes are different.

12. A light projection system comprising:

a light source;

a lens positioned to receive light from the light source; and the lens having a plurality of lens segments arranged in an array, the lens segments having predetermined patterns, wherein some of the lens segments have different predetermined patterns.

13. A segmented aperture lens for distributing light from a light source over a predetermined target portion, comprising:

a plurality of segments each including a fresnel lens, the segments being arranged in an array, each segment adapted to project light from the light source onto each point of the target portion, wherein some of the segments have different focal lengths.

14. The lens of claim 13, wherein the fresnel lens in the segments have substantially the same focal lengths.

15. The lens of claim 13, wherein the segments are arranged in a two-dimensional array.

16. The lens of claim 13, wherein the segments are arranged in a one-dimensional array.

17. A method of illuminating at least a portion of a target, comprising:

providing a light source in a camera;

providing a lens having an array of lens segments; and illuminating, with the light source, the target portion through the lens segments, wherein each point of the target portion is substantially contributed by each of the lens segments to enhance uniformity of illumination.

18. The method of claim 17, wherein providing the lens includes providing an array of fresnel lens segments.

19. The method of claim 17, wherein providing the lens includes providing a two-dimensional array of lens segments.

20. The method of claim 17, wherein providing the lens includes providing a one-dimensional array of lens segments.

21. A camera comprising:

a camera light source; and a lens having a plurality of lens segments, the lens segment having one or more predetermined patterns and arranged to distribute light from the camera light source onto a target portion.

* * * * *